US008564802B2

(12) United States Patent
Adachi

(10) Patent No.: US 8,564,802 B2
(45) Date of Patent: Oct. 22, 2013

(54) IMAGE DEFECT INSPECTION APPARATUS, IMAGE DEFECT INSPECTION SYSTEM, IMAGE DEFECT INSPECTION METHOD AND NON-TRANSITORY COMPUTER READABLE RECORDING MEDIUM

(75) Inventor: Koji Adachi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 318 days.

(21) Appl. No.: 13/020,509

(22) Filed: Feb. 3, 2011

(65) Prior Publication Data

US 2012/0013935 A1 Jan. 19, 2012

(30) Foreign Application Priority Data

Jul. 16, 2010 (JP) ................................ 2010-161444

(51) Int. Cl.
*G06F 15/00* (2006.01)

(52) U.S. Cl.
USPC ........................................................ 358/1.14

(58) Field of Classification Search
USPC ............................................... 358/1.14, 1.15
See application file for complete search history.

(56) References Cited

U.S. PATENT DOCUMENTS

| | | | | |
|---|---|---|---|---|
| 2009/0033970 A1* | 2/2009 | Bray et al. | ................... | 358/1.13 |
| 2009/0033993 A1 | 2/2009 | Nakazato et al. | | |
| 2009/0034990 A1 | 2/2009 | Nakazato et al. | | |

FOREIGN PATENT DOCUMENTS

| | | |
|---|---|---|
| JP | A-06-262800 | 9/1994 |
| JP | A-11-109807 | 4/1999 |
| JP | A-2008-173869 | 7/2008 |
| JP | A-2009-037141 | 2/2009 |

* cited by examiner

*Primary Examiner* — Saeid Ebrahimi Dehkordy
(74) *Attorney, Agent, or Firm* — Oliff & Berridge, PLC

(57) ABSTRACT

An image defect inspection apparatus includes a supply unit, an acquiring unit, an inspection unit and an adjustment unit. The supply unit supplies a test image corresponding to an inferred image defect regarding an image forming unit that forms an image on a recording material, to the image forming unit to form the test image on the recording material. The acquiring unit acquires a scanned image obtained by scanning the recording material on which the test image is formed. The inspection unit compares the scanned image acquired with the test image and inspects as to whether or not the inferred image defect is in the scanned image. The adjustment unit adjusts a value of a setting item which is defined as an adjust target regarding the inferred image defect, so as to enhance detectability of the inferred image defect in the inspection.

7 Claims, 7 Drawing Sheets

FIG. 4

| IMAGE FORMATION PARAMETERS | IMAGE DEFECTS | | | | |
|---|---|---|---|---|---|
| | HIGH BACKGROUND | STREAKS AND BANDS | COLOR SHIFT | GHOST | ... |
| Vmc | ○ | | | | |
| LaserPower | ○ | | | | |
| TcTargetNominal | ○ | | | | |
| ledIntensityAt | ○ | | ○ | | |
| PreTransferGridVoltage | | ○ | | | |
| Cleaner Brush Bias | | ○ | | | |
| Age | | ○ | | | |
| VwdACSetup | | ○ | | | |
| VWireDonor | | ○ | | | |
| Vdm Load | | ○ | | | |
| Vmag | | | ○ | | |
| PreTransferGridVoltage | | | ○ | | |
| Transfer Shield Current | | | ○ | | |
| TonerPurgeOn | | | ○ | | |
| PreClean Shield Current | | | | ○ | |
| PreClean Wire Voltage | | | | ○ | |
| CleanerBiasInDC | | | | ○ | |
| CleanerBiasDuringPrint | | | | ○ | |
| ⋮ | | | | | |

IMAGE DEFECT INSPECTION APPARATUS, IMAGE DEFECT INSPECTION SYSTEM, IMAGE DEFECT INSPECTION METHOD AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2010-161444 filed on Jul. 16, 2010.

BACKGROUND

1. Field of the Invention

One exemplary embodiment of the invention relates to an image defect inspection apparatus, an image defect inspection system, an image defect inspection method and a non-transitory computer readable recording medium storing a program that causes a computer to execute an image defect inspection process.

2. Related Art

With regard to detecting failures such as an image defect occurring in an image forming apparatus that forms an image on a recording material such as a sheet of paper, various types of apparatuses, systems and methods have been proposed.

SUMMARY

According to one exemplary embodiment of the invention, an image defect inspection apparatus includes a supply unit, an acquiring unit, an inspection unit and an adjustment unit. The supply unit supplies a test image corresponding to an inferred image defect regarding an image forming unit that forms an image on a recording material, to the image forming unit to form the test image on the recording material. The acquiring unit acquires a scanned image obtained by scanning the recording material on which the test image is formed by the image forming unit. The inspection unit compares the scanned image acquired by the acquiring unit with the test image and inspects as to whether or not the inferred image defect is in the scanned image. The adjustment unit adjusts a value of a setting item which is defined as an adjust target regarding the inferred image defect, so as to enhance detectability of the inferred image defect in the inspection by the inspection unit.

BRIEF DESCRIPTION OF THE DRAWINGS

Exemplary embodiments of the invention will be described in detail below with reference to the accompanying drawings, wherein:

FIG. 4 is a diagram showing a relationship between image defects and image formation parameters in the image defect inspection system according to one exemplary embodiment of the invention;

DETAILED DESCRIPTION

Exemplary embodiments of the invention will be described with reference to the accompanying drawings.

Figure 1:
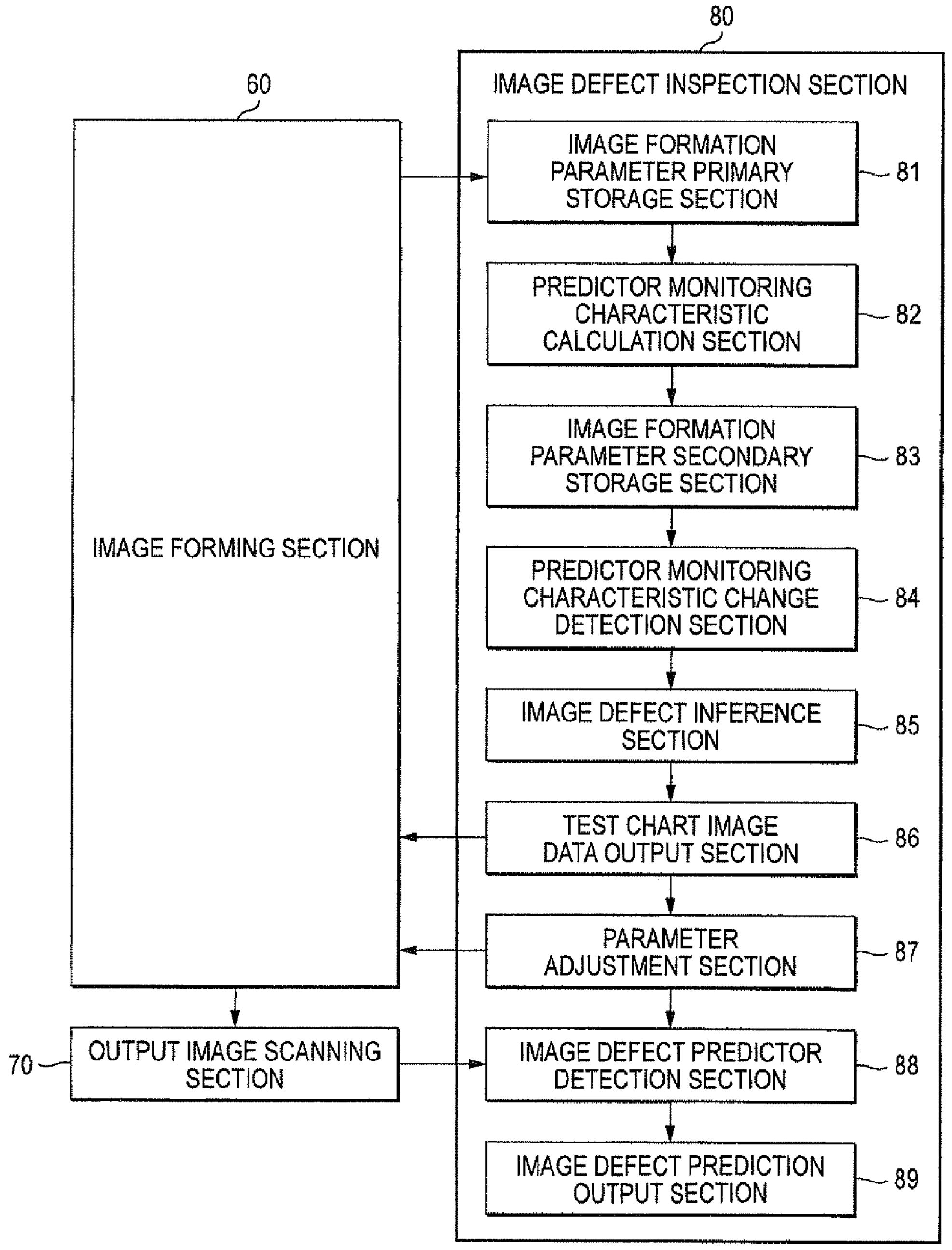
FIG. 1 is a diagram showing a functional block of an image defect inspection system according to one exemplary embodiment of the invention.

FIG. 1 shows functional blocks of a fault check system according to one exemplary embodiment of the invention. The fault check system of the example is implemented by an image forming apparatus including an image forming section 60, an output image scanning section 70 and an image defect inspection section 80. The image forming section 60 forms an image on a recording material. The output image scanning section 70 scans an image output by the image forming section 60. The image defect inspection section 80 checks an image defect in the image forming section 60. That is, the fault check system of the example (image forming apparatus) includes the image defect inspection section 80 serving as an image defect inspection apparatus therein and checks an image defect (image defects) in the image forming section 60 by the image forming apparatus itself. Examples of the image forming apparatus include a printer (printing machine), a copier (a copying machine), a facsimile, and a multifunction device having multiple functions of printing/copying/facsimile.

First, the image forming section 60 will be described.

Figure 2:
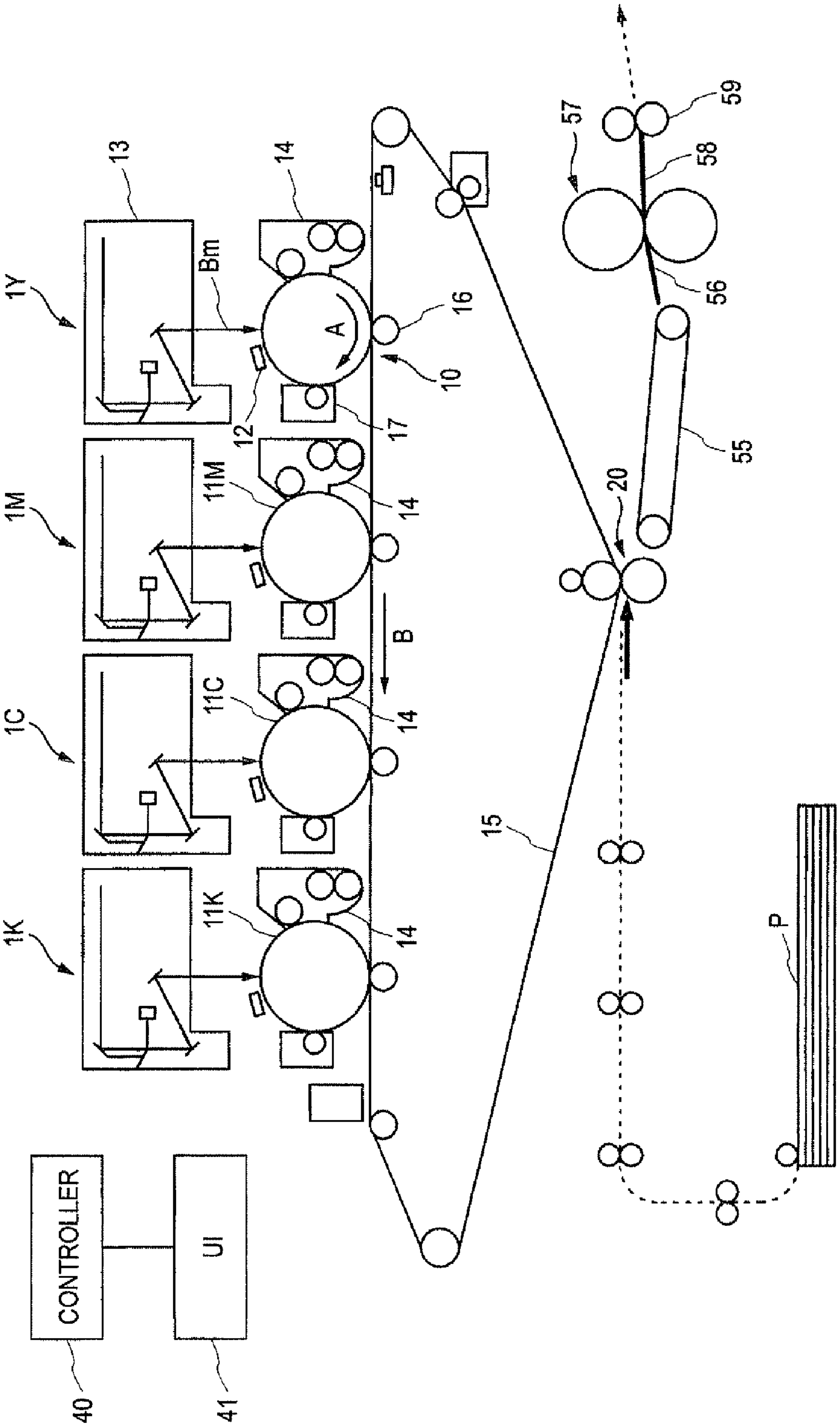
FIG. 2 is a diagram showing the configuration of an image forming section in the image defect inspection system according to one exemplary embodiment of the invention.

FIG. 2 shows the configuration of the image forming section 60. The image forming section 60 employs an intermediate transfer system which is so called a tandem type. The image forming section 60 has plural image fruiting units 1Y, 1M, 1C, 1K, a primary transfer section 10, a secondary transfer section 20, a fuser 57, a controller 40 and a user interface (UI) 41. The image forming units 1Y, 1M, 1C, 1K form toner images of respective color components by the electronic photography method. The primary transfer section 10 sequentially transfers (primarily transfers) the respective color component toner images formed by the respective image forming units 1Y, 1M, 1C, 1K onto an intermediate transfer belt 15. The secondary transfer section 20 collectively transfers (secondarily transfers) the superposed toner images, which was transferred onto the intermediate transfer belt 15, onto a sheet of paper P, which is an example of a recording material. The fuser 57 fixes the secondarily transferred image onto the sheet of paper P. The controller 40 controls operation of each device (each section). The user interface 41 receives an instruction from a user.

In the example, the respective image forming units 1Y, 1M, 1C, 1K have photoreceptor drums 11Y, 11M, 11C, 11K which rotate in an arrow A direction. In the vicinity of each of the photoreceptor drums 11Y, 11M, 11C, 11K, various electrophotographic devices are provided. The electrophotographic devices include a charging device 12, a laser exposure device 13, a developing device 14, a primary transfer roll and a drum cleaner. The charging device 12 charges the photoreceptor drum 11. The laser exposure device 13 (in the drawing, an exposure beam is designated by in the symbol “Bm”) writes an electrostatic latent image on the photoreceptor drum 11.

The developing device 14 houses a toner of each color component and visualizes the electrostatic latent image on the photoreceptor drum 11 with the toner. The primary transfer roll 16 transfers the toner image of each color component, which is formed on the photoreceptor drum 11, onto the intermediate transfer belt 15 in the primary transfer section 10. The drum cleaner 17 removes a remaining toner on the photoreceptor drum 11.

These image forming units 1Y, 1M, 1C, 1K are disposed in an approximately straight manner, in an order of yellow (Y), magenta (M), cyan (C), black (K), from an upstream side of the intermediate transfer belt 15. Each of the photoreceptor drums 11Y, 11M, 11C, 11K is configured to be able to detachably contact with the intermediate transfer belt 15.

In the example, a paper transport system includes a feeding member, a transport belt 55, a fuser inlet guide 56, a exit guide 58 and a exit roll 59. The feeding member takes out a sheet of paper P from a paper accommodation section and feeds it to the secondary transfer section 20. The transport belt 55 conveys the sheet of paper P, which is transported after the secondary transfer, to the fuser 57. The fuser inlet guide 56 guides the sheet of paper P to the fuser 57. Also, the exit guide 58 guides the sheet of paper P discharged from the fuser 57. The exit roll 59 discharges the sheet of paper P guided by the exit guide 58 to an outside.

That is, the sheet of paper P onto which the toner image is electrostatically transferred by the secondary transfer section 20 is transported to the transport belt 55 with peeled off from the intermediate transfer belt 15. The transport belt 55 conveys the sheet of paper P at an optimal transport speed to the fuser 57 through the fuser inlet guide 56, in response to a transport speed in the fuser 57. The non-fixed toner image on the paper P transported to the fuser 57 is subject to a fixing process by heat and pressure by the fuser 57, thus fixed onto the sheet of paper P. The sheet of paper P formed with the fixed image is transported, through the exit guide 58 and the transfer roll 59, to a discharge accommodation section (not shown) which is provided outside the image forming apparatus.

Next, the image defect inspection section 80 will be described.

The image defect inspection section 80 of the example includes an image formation parameter primary storage section 81, a predictor monitoring characteristic calculation section 82, an image formation parameter secondary storage section 83, a predictor monitoring characteristic change detection section 84, an image defect inference section 85, a test chart image data output section 86, a parameter adjustment section 87, an image defect predictor detection section 88, and an image defect prediction output section 89.

The image formation parameter primary storage section 81 is a buffer memory for temporarily storing image formation parameters and auxiliary data which are acquired from the image forming section 60 in a predetermined unit time. In the example, the image formation parameter primary storage section 81 holds the stored data, in time series order, by adding a time line indicating information such as time information to the stored data (the image formation parameters and the auxiliary data).

Examples of the image formation parameters include measured values of respective parts such as a charge potential of the charging device 12, a laser light intensity of the laser exposure device 13, a toner density in the developing device 14, a primary transfer current in the primary transfer section 10, a secondary transfer current in the secondary transfer current 20, a fusing roll temperature of the fuser 57. The image formation parameters may include not only the measured values of the respective parts, but also setting values for controlling the respective parts. Also, the image formation parameters may include a difference between the measured values of each part and the setting value for each part.

Also, examples of the auxiliary data include process control information such as patch density information for controlling an image forming process in the image forming section 60, job information (command information) such as a pixel count number indicating an image density, environment information such as a temperature and a humidity inside the apparatus. The auxiliary data is used to analyze a cause of a change point of the image formation parameter.

Every time image formation parameters for predetermined unit number of copies are stored in the image formation parameter primary storage section 81, the predictor monitoring characteristic calculation section 82 reads the image formation parameters for the unit number of copies, which are stored in the image formation parameter primary storage section 81 in time series order, and calculates statistics such as an average value, a standard deviation, a maximum value and a minimum value of the respective image formation parameters. In the example, the calculated statistics regarding the respective image formation parameters will be referred to as (image defect) predictor monitoring characteristics.

The image formation parameter secondary storage section 83 stores the predictor monitoring characteristics calculated by the predictor monitoring characteristic calculation section 82. In the example, by adding information indicating a time line such as time information to the stored data (predictor monitoring characteristics), the image formation parameter secondary storage section 83 holds the predictor monitoring characteristics in time series order.

Also, in the example, the predictor monitoring characteristic calculation section 82 calculates statistics of the auxiliary data such as an average value, and stores it in the image formation parameter secondary storage section 83 together with a corresponding predictor monitoring characteristic.

The predictor monitoring characteristic change detection section 84 reads the predictor monitoring characteristics, which are stored in time series order in the image formation parameter secondary storage section 83, and detects an abnormal change (a change leading to a state which is inferred as being image quality degradation) in a time series change of the predictor monitoring characteristics. In the example, from the viewpoints of (i) whether or not a degree of deviation from a tendency of the time series change which is predicted by the regression analysis is equal to or larger than a threshold value, (ii) whether or not the predictor monitoring characteristic is outside a normal range which is set for each image formation parameter, and/or the like, the predictor monitoring characteristic change detection section 84 detects an abnormal change in the time series change of the predictor monitoring characteristics.

Figure 3:
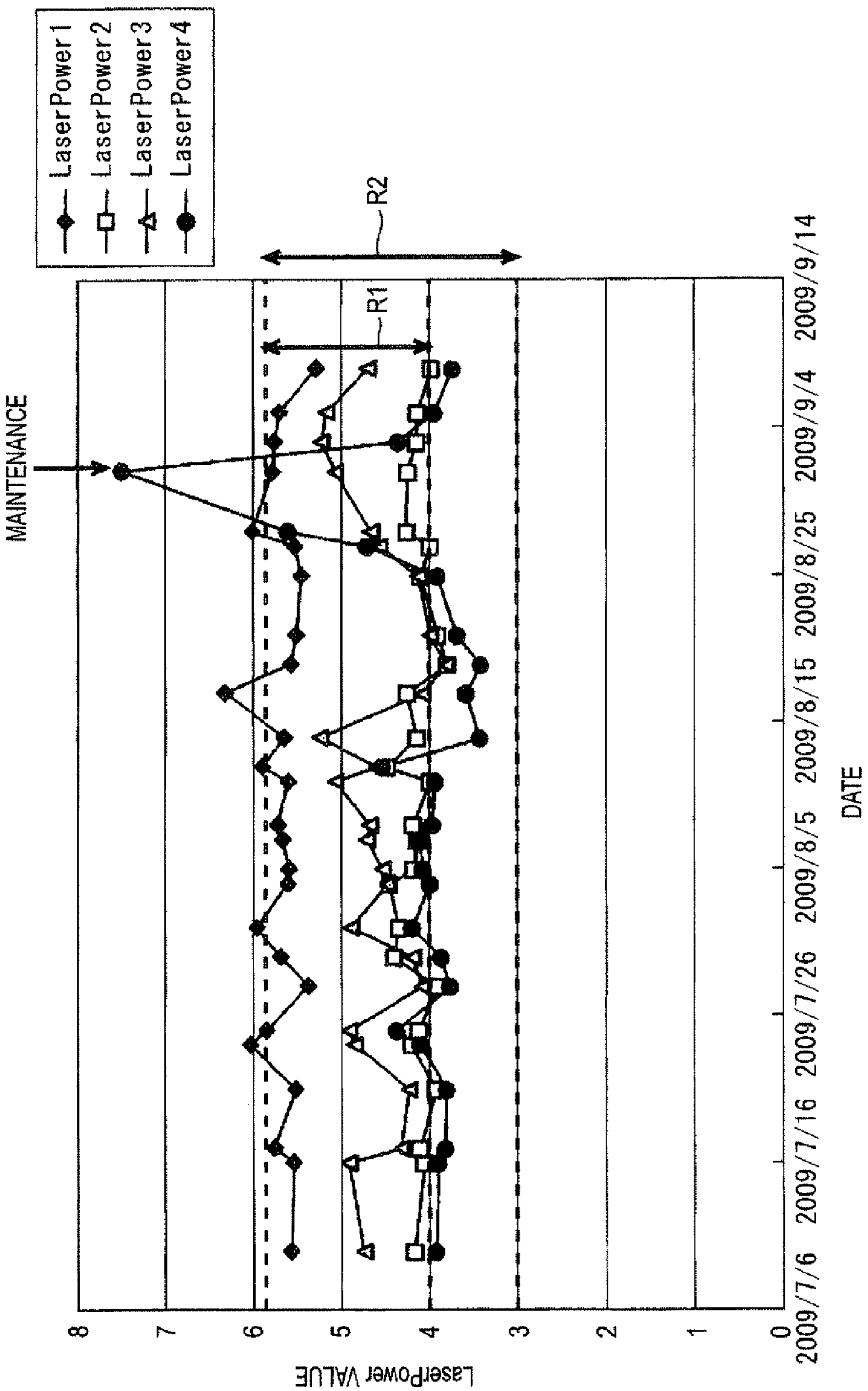
FIG. 3 is a diagram showing, in a time series manner, in time series order, predictor monitoring characteristics relating to laser light intensity in the image defect inspection system according to one exemplary embodiment of the invention.

FIG. 3 shows, in time series order, predictor monitoring characteristics regarding LaserPower (laser light intensity), which are one example of the image formation parameters. In FIG. 3, LaserPower 1 to LaserPower 4 correspond to the laser light intensity of the laser exposure devices 13 for M (magenta) image formation, Y (yellow) image formation, C (cyan) image formation and K (black) image formation. Average values of each of the LaserPowers which are sampled in predetermined time intervals are plotted in time series order. Also, in FIG. 3, "R1" indicates a normal range for the M, Y, and C LaserPower 1 to 3, and "R2" indicates a normal range for K LaserPower 4.

According to FIG. 3, the M, Y, and C LaserPowers 1 to 3 substantially fall under the normal range R1, so that it can be seen that there is no operation problem. On other hand, the K LaserPower 4 suddenly rises around Aug. 25, 2009. In this case, the predictor monitoring characteristic change detection section 84 detects such an abnormal change that a degree of deviation between the predictor monitoring characteristic amount regarding the K LaserPower 4 and the tendency of the time series change predicted by the regression analysis is equal to or larger than the threshold value (or that the predictor monitoring characteristic amount regarding the K LaserPower 4 is outside the normal range R2). Also, according to FIG. 3, it is confirmed that maintenance is conducted at date and time indicated by an arrow, and the K LaserPower 4, which suddenly changed, returns to a normal state. The example shown in FIG. 3 is a case where an image defect which is called "high background" occurs which is caused by toner adherence to a background part of an image.

The image defect inference section 85 infers an image defect which have occurred (or will occur soon) based on (i) the predictor detection characteristic in whose time series change the predictor monitoring characteristic change detection section 84 detects the abnormal change and (ii) the auxiliary data at a point in time where the abnormal change occurs. The image defect inference section 85, for example, estimates the image defect, which would occur, using a table (correspondence table) indicating a relationship between the image defects and the image formation parameters, which is prepared based on information regarding trouble shootings (fault solvings) being performed in the past.

FIG. 4 shows a relationship between the image defects and the image formation parameters (partially excerpted). In FIG. 4, the relationship between the image defects and the image formation parameters is shown in the matrix form. For each image formation parameter, a circle mark (O) is shown in one or plural columns corresponding to image defects which are predicted when an abnormal change regarding each image formation parameter is detected. According to the example of FIG. 4, an image defect corresponding to an abnormal change regarding the LaserPower shown in FIG. 3 is the "high background", and it is predicted that the image defect of "high background" occurs. Occurrence situations and occurrence causes of each image defect spread over wide ranges. Also, a time series change of each image formation parameter has various causes. Therefore, even if an abnormal change of the LaserPower is detected, there is a possibility that the abnormal change may be caused by a mere local parameter variation, but an image defect may not occur.

As described above, a process is simplified by employing in the image defect inference section 85 the simple table showing the relationship between the image formation parameters and the image defects. However, if the image formation parameters change in combination, estimation precisions of the image defects would lower. Also, it is difficult to effectively use the auxiliary data such as the process control information, the job information and the environment information. Thus, for example, an image defect reasoning model based on the Bayesian network may be employed which can deal with composite variation of the image formation parameters and which can effectively use the auxiliary data. The Bayesian network is a network by directed graphs based on a cause and effect relationship. The Bayesian network can establish an image defect reasoning model which infers an image defect with using as inputs each image formation parameter from which an abnormal change is detected and the auxiliary data at a point in time where the abnormal change occurs.

Figure 5:
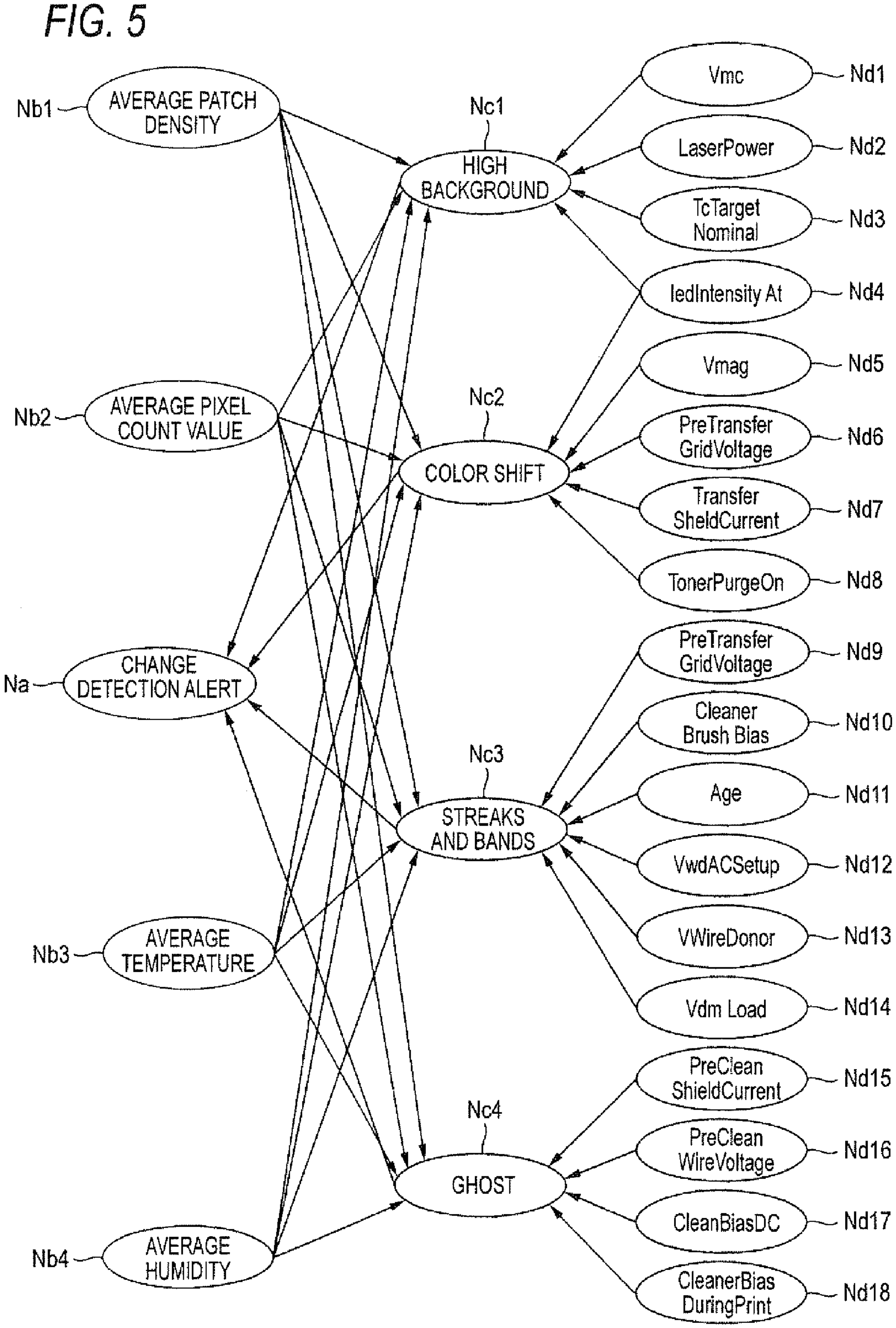
FIG. 5 is a diagram showing an image defect reasoning model by the Bayesian network in the image defect inspection system according to one exemplary embodiment of the invention.

FIG. 5 shows an image defect reasoning model based on the Bayesian network. In the example of FIG. 5, the image defect reasoning model includes a node Na indicating a detection notice of an image defect, nodes Nb (Nb1 to Nb4) indicating the respective auxiliary data, nodes Nc (Nc1 to Nc4) indicating the respective image defects, and nodes Nd (Nd1 to Nd18) indicating the respective image formation parameters.

FIG. 5 shows the followings. That is, the image defect of "high background" is inferred based on four image formation parameters of the node Nd1 to Nd4 which are inputs to the node Nc1. An image defect of "color shift" is inferred based on five image formation parameters of the node Nd4 to Nd8 which inputs to the node Nc2. An image defect of "streaks and bands" is inferred based on six image formation parameters of the node Nd9 to Nd14 which are inputs to the node Nc3. An image defect of "ghost" is inferred based on four image formation parameters of the nodes Nd15 to Nd18 which are inputs to the node Nc4.

Also, the nodes Nb (Nb1 to Nb4) indicating the auxiliary data including the process control information such as the average patch density, the job information such as the average pixel count value, and the environment information such as the average temperature and the average humidity are inputs to the node Nc (Nc1 to Nc4) indicating the respective image defects. That is, FIG. 5 shows that these auxiliary data are used in estimation of image defect.

Also, the nodes Nc (Nc1 to Nc4) indicating the respective image defects are inputs to the node Na indicating a detection notice of an image defect. Thus, in response to detection of occurrence of an image defect, the notice is output.

Each node Nc (Nc1 to Nc4) indicating the image defect has a condition probability table in which influence degrees of the image formation parameters and auxiliary data (degrees to which the image formation parameters and auxiliary data influence the image defect) are set. The nodes Nc (Nc1 to Nc4) are configured so as to estimate occurrence of an image defect with considering the influence degrees of the image formation parameters and auxiliary data. For example, the image defect of "ghost" easily occurs under an environment of high temperature and high humidity. Therefore, by changing an occurrence probability of the image defect of "ghost" according to the environment information of the image forming apparatus, it is possible to improve an estimation accuracy of the occurrence of the image defect of "ghost".

If, as an estimation result of an image defect by the image defect inference section 85, it is determined that a predictor diagnosis of an image defect using a test chart image (an image for inspection) is needed, an inquiry to a user as to whether or not a predictor diagnosis based on a status of the image forming apparatus and the test chart image output is displayed on an operation panel. If an operation input instructing to execute the predictor diagnosis is received from a user through the operation panel, an image defect inspection process is executed by the test chart image data output section 86, the parameter adjustment section 87, and the image defect predictor detection section 88.

The test chart image data output section 86 provides data of a test chart image corresponding to the image defect, which is inferred by the image defect inference section 85, to the image forming section 60, and forms the test chart image on a recording material such as a sheet of paper. For example, if an image defect of "density unevenness" or "deletion" is inferred, a halftone patch image is used as a test chart image. If an image defect of "high background" or "streaks and bands" is inferred, a blank image is used as a test chart image. If an image defect of "ghost" is inferred, an image in which small solid-image patches, so called solid patches, are arranged in predetermined intervals is used as a test chart image.

In the example, data of each test chart image is held in a memory in association with the image defect. Data of a test charge image which is specified in accordance with an inferred image defect is read out from the memory, and output to the image forming section 60.

When the image forming section 60 forms the test chart image on the recording material, the parameter adjustment section 87 adjusts image formation parameters in the image forming section 60 so as to make the image defect, which is inferred by the image defect inference section 85, be conspicuous on the recording material. Specifically, for example, if the image defect of "high background" or "ghost" is inferred, the developing potential in the developing device 14 is adjusted so as to easily detect a low-density image, which results in that a predictor of the image defect easily occurs.

The parameter adjustment section 87 may adjust an image formation parameter from which an abnormal change is detected by the predictor monitoring characteristic change detection section 84. Specifically, for example, with regard to an abnormal change of LaserPower which is an image formation parameter being a ground for predicting occurrence of the image defect of "high background", by returning a value of LaserPower to an average value before the abnormal change is detected, a predictor of the image defect of "high background" tends to be conspicuous. Similarly, in the relationship shown in FIG. 4, if an abnormal change is detected in values of PreTransferGridVoltage and if an image defect of "streaks and bands" is detected, a developing potential is adjusted so that image defect of "streaks and bands" is easily detected, and by returning a value of PreTransferGridVoltage to an average value before the abnormal change is detected, the image forming apparatus is brought in a state where the image defect of "streaks and bands" easily occurs.

In the example, adjustment data including (1) information indicating what image formation parameter(s) are adjustment target(s) and (2) information indicating how to adjust the image formation parameter(s) (or specific adjustment value (s)) are stored in the memory in association with an image defect. The adjustment data corresponding to the inferred image defect is read out from the memory and output to the image forming section 60 so as to adjust image formation parameters relating to control of, for example, operations of the respective sections/parts.

Also, the parameter adjustment section 87 adjusts image processing parameters in the image defect predictor detection section 88, which will be described in detail below.

The image defect predictor detection section 88 performs predictor detection of an image defect in the following manner. That is, the image defect predictor detection section 88 compares data of the test chart image provided to the image forming section 60 by the test chart image data output section 86 and data of scanned images obtained by scanning the recording material on which the test chart image is formed by the image forming section 60 to detect a difference therebetween, and inspects as to whether or not there is the image defect (the image defect inferred by the image defect estimation part 85) in the read image.

Herein, in the example, the data of the scanned image is obtained by the output image scanning section 70 being provided as a print inspection device on a path along which the recording material on which the image is formed by the image forming section 60 is transported to the discharge accommodation section being disposed outside the image forming apparatus. Then, the data of the scanned image is compared with the data of the test chart image. An image scanning section which scans an original to be copied in a copying process may be used as the output image scanning section 70. In this case, for example, information prompting a user to place the recording material, which is discharged to the discharge accommodation section, on the image scanning section may be displayed on the operation panel, and the formed image is read through a manual operation.

Also, in the example, in inspecting, by the image defect predictor detection section 88, as to whether or not there is an image defect, the parameter adjustment section 87 adjusts the image processing parameters in the image defect predictor detection section 88 to increase detectability of the image defect inferred by the image defect inference section 85 (to make the image defect be easily detected), to thereby enhance a detection sensitivity. As examples of the image processing parameters adjusted by the image defect predictor detection section 88 include an image division number, a threshold value interval, and a type of a filter.

For example, if a predictor regarding the image defect of "density unevenness" is detected, image processing parameters are adjusted so that, when the scanned image is processed, an image region is not divided, a smoothing filter is used, and projection waveform integration values in a main scanning direction and sub-scanning direction are calculated. If a change in the projection waveform integration value in the main scanning direction exceeds a predetermined threshold range, it is determined that the image defect of "density unevenness" is in the scanning direction or in the direction of drum axis. Also, if a change in the projection waveform integration values in the sub-scanning direction exceeds the predetermined threshold range, it is determined that the image defect of "density unevenness" is in the sub-scanning direction. By adjusting the threshold range for the change in projection waveform integration values, performance of detecting a predictor regarding the image defect of "density unevenness" can be adjusted.

For example, if a predictor regarding the image defect of "streaks and bands" is detected, image processing parameters area adjusted so that, when the scanned image is processed, an image region is not divided, an edge enhancement filter is used, and then a defect region is detected using a predetermined binarization threshold value. The morphology process is performed for the binarized image, concatenation in the main scanning direction and concatenation in the sub-scanning direction are detected, and it is determined as to whether or not there is the image defect of "streaks and bands". By adjusting an intensity of the edge enhancement filter and the binarization threshold value, performance of detecting a predictor regarding the image defect of "streaks and bands" can be adjusted.

For example, if a predictor of the image defect of "deletion" is detected, image processing parameters area adjusted so that, when the scanned image is processed, an image region is divided into plural small regions, the edge enhancement filter is applied to each small region, a region of a deletion image is extracted using a binarization threshold value which is based on a density average of each small region. Similarly to the predictor detection of the image defect of "streaks and bands" as described above, the morphology process is performed for the image defect of "deletion", concatenation in the main scanning direction and concatenation in the sub-scanning direction are detected, and it is determined as to whether or not there is the image defect of "deletion". By adjusting an intensity of the edge enhancement filter and the binarization threshold value, performance of detecting a predictor regarding the image defect of "deletion" can be adjusted.

In the example, adjustment data including (1) information indicating what image processing parameter(s) are adjustment target(s) and (2) information indicating how to adjust the image processing parameter(s) (or specific adjustment value(s)) are stored in the memory in association with an image defect. The adjustment data corresponding to the inferred image defect is read out from the memory and output to the image defect predictor detection section 88 so as to adjust image processing parameters relating to control of, for example, operations of the respective sections/parts.

The image defect prediction output section 89 displays information about the image defect and/or countermeasure on the operation panel, in response to the fact that the image defect is detected by the image defect predictor detection section 88. It is noted that a method of outputting the information about the detected image defect and/or countermeasure is not limited to display output on the operation panel. For example, the information about the image defect and/or countermeasure may be provided to the image forming section 60 to form it on a recording material for output. Alternatively, the information about the image defect and/or countermeasure may be sent via email to a transmission destination which is designated in advance.

If plural image defects are inferred by the image defect inference section 85, the image defect inspection process by the test chart image data output section 86, the parameter adjustment section 87, and the image defect predictor detection section 88 is repeatedly performed for the respective image defects, and the image defect prediction output section 89 displays the results on the operation panel. Alternatively, if plural image defects are inferred, for example, the image defect inspection process may be performed in an order from an image defect whose occurrence probability is the highest, the process may be stopped at a time when the image defect is detected, and the image defect inspection process may not be performed for the remaining image defects. Further alternatively, of the inferred plural image defects, the image defect inspection process may be performed only for image defect which is designated by a user.

Figure 6:
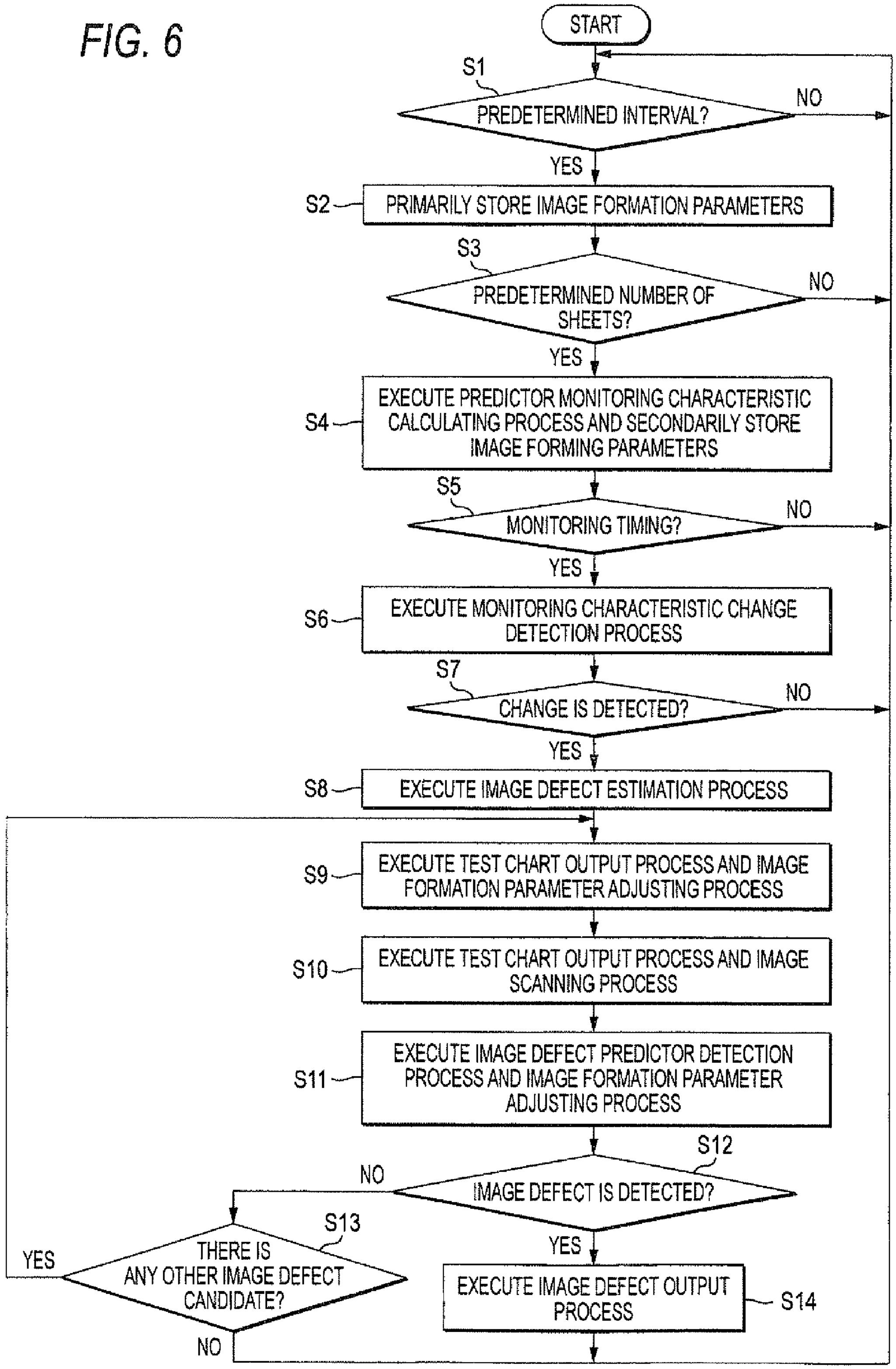
FIG. 6 is a flowchart of an image defect inspection process in the image defect inspection system according to one exemplary embodiment of the invention.

FIG. 6 shows a flowchart of the image defect inspection process in the image defect inspection system according to the exemplary embodiment.

The image formation parameters and the auxiliary data, which are obtained from the image forming section 60 every predetermined unit time, are stored in the image formation parameter primary storage section 81 (steps S1, S2).

Whenever the image formation parameters for the predefined unit number of copies is stored in the image formation parameter primary storage section 81, the predictor monitoring characteristic calculation section 82 calculates a predictor monitoring characteristic regarding each image formation parameter and store the calculated predictor monitoring characteristics in the image formation parameter secondary storage section 83 (steps S3, S4).

When a predetermined monitoring timing comes, the predictor monitoring characteristic change detection section 84 performs detection of an abnormal change in a time series change of the predictor monitoring characteristics (steps S5, S6).

If the predictor monitoring characteristic change detection section 84 detects the abnormal change in the time series change of the predictor monitoring characteristics, the image defect inference section 85 estimates an image defect which would occur (steps S7, S8).

One of the image defects, which are inferred by the image defect inference section 85, is picked up as a candidate, and the following process (steps S9 to S11) is performed for the candidate.

The test chart image data output section 86 provides the data of the test chart image corresponding to the image defect candidate to the image forming section 60, and forms a test chart image on a recording material by the image forming section 60. At this time, the parameter adjustment section 87 provides adjustment data, which include (1) information indicating what image formation parameters are adjustment targets and (2) information indicating how to adjust the image defects, to the image forming section 60 in response to the image defect candidate, and adjusts an operation of the image forming section 60. Thereby, the image defect candidate becomes conspicuous on the recording material (step S9).

When the test chart image by the image forming section 60 is formed on the recording material, the output image scanning section 70 scans the recording material and obtains data of the scanned image (step S10).

The image defect predictor detection section 88 compares the test chart image corresponding to the image defect candidate with the scanned image to inspect as to whether or not there is the image defect candidate in the scanned image. At this time, the parameter adjustment section 87 provides adjustment data, which includes (1) information indicating what image processing parameter(s) are adjustment target(s) and (2) information indicating how to adjust the image processing parameters, to the image defect predictor detection section 88 in response to the image defect candidate, and adjusts an operation of the image defect predictor detection section 88. Thereby, a detection sensitivity of the image defect candidate is enhanced (step S11).

If the image defect predictor detection section 88 does not detect the image defect candidate in the scanned images, a next image defect is set to a candidate, and the above processes (steps S9 to S11) are performed therefor. The processes (steps S9 to S11) are repeated until all the inferred image defects are processed (steps S12, S13).

If the image defect predictor detection section 88 detects the image defect candidate in the scanned image, the image defect prediction output section 89 displays information about the detected image defect and countermeasure on the operation panel (steps S12, 14).

As described above, in the image defect inspection system of the example, the parameter adjustment section 87 provides the image formation parameters of the adjustment targets and the adjustment amounts of the image formation parameters in accordance with the image defects inferred by the image defect inference section 85 to the image forming section 60, and adjusts the operation of the image forming section 60. Also, the parameter adjustment section 87 provides the image processing parameters of the adjustment targets and the adjustment amounts of the image processing parameters in accordance with the image defects to the image defect predictor detection section 88 and adjusts the operation of the image defect predictor detection section 88. Thereby, the image defect is made to be easily detected in the inspection executed by the image defect predictor detection section 88. It should be noted that one of (i) the adjustment of the operation of the image forming section 60 and (ii) the adjustment of the operation of the image defect predictor detection section 88 may be performed.

Also, in the image defect inspection system of the example, the image forming apparatus checks image defects by itself alone. However, a monitoring server which is provided separately from the image forming apparatus may check image defects.

In one example, of the respective functional sections constituting the image defect inspection system, the image formation parameter secondary storage section 83, the predictor monitoring characteristic change detection section 84, and the image defect inference section 85 may be provided in the monitoring server. The monitoring server may check image defects in plural image forming apparatuses with wired or wireless communication. With this configuration, a remote monitoring system can be established. In this case, the predictor monitoring characteristic calculation section 82 in each image forming apparatus calculates a predictor monitoring characteristics of each image formation parameter. Then, the calculated predictor monitoring characteristics are transmitted to the monitoring server, and stored in the image formation parameter secondary storage section 83. Based on the predictor monitoring characteristics transmitted from the plural image forming apparatuses, the monitoring server performs detection of an abnormal change in the time series change of the predictor monitoring characteristics for each image forming apparatus and estimation of image defects. If it is determined that an predictor diagnosis based on a test chart image output is needed, information indicating the determination is transmitted to the image forming apparatus. Inquiry to a user as to whether or not the predictor diagnosis based on the status of the image forming apparatus and the test chart image output is needed is displayed on an operation panel. In accordance with a user's instruction, the image defect inspection process is executed.

Figure 7:
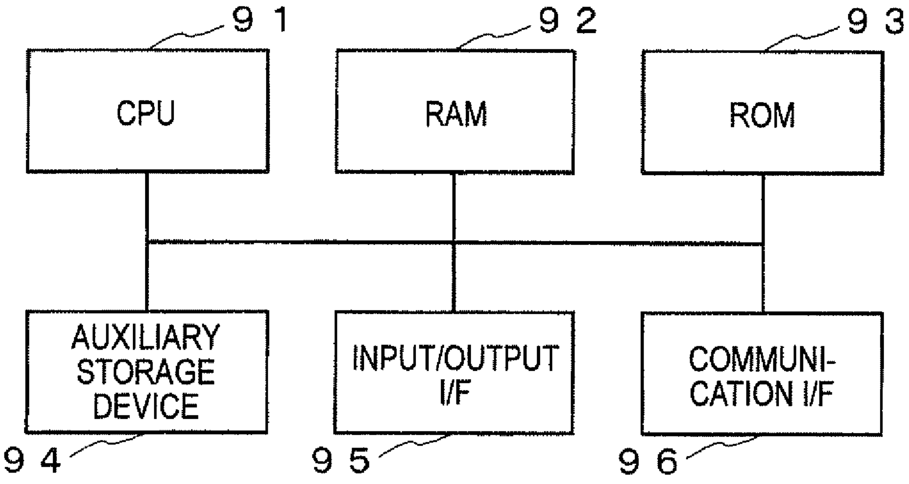
FIG. 7 is a diagram showing a main hardware configuration of a computer serving as a fault check apparatus in the image defect inspection system according to one exemplary embodiment of the invention.

FIG. 7 shows a main hardware configuration of a computer which operates as an image defect inspection section 80 (image defect inspection apparatus) in the image defect inspection system of the example.

In the example, the computer includes hardware resources such as a CPU 91, a main storage device, an auxiliary storage device 94, an input/output interface 95 and a communication interface 96. The CPU 91 executes various operation processes. T main storage device includes a RAM 92 which is a working area for the CPU 91 and a ROM 93 in which a basic control program is stored. The auxiliary storage device (for example, a magnetic disk such as a HDD, a cacheable non-volatile memory such as flash memory, and the like) 94 stores a program according to the above exemplary embodiment of the invention and various types of data. The input/output interface 95 is an interface to an input device such as operation buttons and a touch panel which are used in input operation by a user and a display device for displaying and outputting various types of information. The communication interface 96 is an interface for performing wired or wireless communication with other devices.

By reading the program according to the exemplary embodiment of the invention from the auxiliary storage device 94, expanding it into the RAM 92, and by running it by the CPU 91, the respective functions of the image defect inspection apparatus according to the exemplary embodiment of the invention is realized on the computer.

In the example, the respective functional sections of the image defect inspection apparatus are provided in a single computer. However, the functional sections may be distributed to plural computers.

Also, the program according to the exemplary embodiment of the invention, for example, is set up on a computer of the example by reading the program from an external storage medium such as a CD-ROM storing the program or by receiving it via a communication line.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image defect inspection apparatus comprising:

a supply unit that supplies a test image corresponding to an inferred image defect regarding an image forming unit that forms an image on a recording material, to the image forming unit to form the test image on the recording material;

an acquiring unit that acquires a scanned image obtained by scanning the recording material on which the test image is formed by the image forming unit;

an inspection unit that compares the scanned image acquired by the acquiring unit with the test image and inspects as to whether or not the inferred image defect is in the scanned image; and an adjustment unit that adjusts a value of a setting item which is defined as an adjust target regarding the inferred image defect before the inspection, so as to enhance detectability of the inferred image defect in the inspection by the inspection unit.

2. The device according to in claim 1, wherein the setting item includes a setting item regarding an operation of the image forming unit.

3. The device according to claim 2, wherein the setting item includes a setting item regarding an operation of the inspection unit.

4. The device according to claim 1, wherein the setting item includes a setting item regarding an operation of the inspection unit.

5. An image defect inspection system comprising:

an image forming unit;

an estimation unit that estimates occurrence of an image defect in the image forming unit;

a supply unit that supplies a test image corresponding to the inferred image defect regarding the image forming unit to the image forming unit to form the test image on a recording material;

an image scanning unit that obtains a scanned image by scanning the recording material on which the test image is formed by the image forming unit;

an inspection unit that compares the scanned image obtained by the image scanning unit with the test image and inspects as to whether or not the inferred image defect is in the scanned image; and an adjustment unit that adjusts a value of a setting item which is defined as an adjust target regarding the inferred image defect before the inspection, so as to enhance detectability of the inferred image defect in the inspection by the inspection unit.

6. A non-transitory computer readable recording medium storing a program that causes a computer to execute an image defect inspection process, the process comprising:

supplying a test image corresponding to an inferred image defect regarding an image forming unit that forms an image on a recording material, to the image forming unit to form the test image on the recording material;

acquiring a scanned image obtained by scanning the recording material on which the test image is formed by the image forming unit;

comparing the scanned image acquired with the test image;

inspecting as to whether or not the inferred image defect is in the scanned image; and adjusting a value of a setting item which is defined as an adjust target regarding the inferred image defect before the inspection, so as to enhance detectability of the inferred image defect in the inspecting.

7. An image defect inspection method, the process comprising:

estimating an occurrence of an image defect in an image forming unit based on a parameter acquired from the image forming unit;

supplying a test image corresponding to the inferred image defect regarding an image forming unit that forms an image on a recording material, to the image forming unit to form the test image on the recording material;

acquiring a scanned image obtained by scanning the recording material on which the test image is formed by the image forming unit;

comparing the scanned image acquired with the test image;

inspecting as to whether or not the inferred image defect is in the scanned image; and adjusting a value of a setting item, which is defined as an adjust target regarding the inferred image defect, before the inspection, so as to enhance detectability of the inferred image defect in the inspection.

* * * * *